United States Patent [19]
Kadija et al.

[11] 4,218,275
[45] Aug. 19, 1980

[54] METHOD OF SEALING SEPARATORS FOR ELECTROLYTIC CELLS FOR ALKALI METAL CHLORIDE BRINES

[75] Inventors: Igor V. Kadija; Kenneth E. Woodard, Jr., both of Cleveland, Tenn.

[73] Assignee: Olin Corporation, New Haven, Conn.

[21] Appl. No.: 875,039

[22] Filed: Feb. 3, 1978

[51] Int. Cl.² .................. B29C 27/02; H01M 2/14
[52] U.S. Cl. .................. 156/73.1; 29/623.4; 29/623.5; 156/217; 156/324.4; 156/333; 429/139; 429/254
[58] Field of Search .............. 156/73.1, 73.4, 70, 156/213, 217, 308, 309, 333; 29/623.4, 623.3, 623.2, 623.1, 623.5; 204/301, 296; 429/136, 139, 247, 254

[56] References Cited

U.S. PATENT DOCUMENTS

| | | | |
|---|---|---|---|
| 3,342,719 | 9/1967 | Chen et al. | 156/73.1 X |
| 3,701,690 | 10/1972 | Dermody et al. | 29/623.3 |
| 3,703,417 | 11/1972 | Rosa et al. | 429/247 X |
| 3,772,089 | 11/1973 | Bennett et al. | 156/73.1 |
| 3,783,061 | 1/1974 | Hahn | 156/73.1 |
| 3,892,620 | 7/1975 | Heussy | 29/623.4 |
| 3,900,341 | 8/1975 | Shoichiro et al. | 29/623.2 |
| 4,026,000 | 5/1977 | Anderson | 156/73.4 X |
| 4,037,030 | 7/1977 | Sabatino | 429/139 |
| 4,124,427 | 11/1978 | Vecchiotti | 156/217 |

FOREIGN PATENT DOCUMENTS 1365483  9/1974  United Kingdom ............. 156/73.4

OTHER PUBLICATIONS

Kolb, D. J., *Designing Plastic Parts for Ultrasonic Assembly*, Machine Design, 39, (No. 7), Mar. 16, 1967, pp. 180–185.

*Primary Examiner*—Michael G. Wityshyn
*Attorney, Agent, or Firm*—James B. Haglind; Donald F. Clements

[57] ABSTRACT

Separator materials suitable for use in electrolytic cells, for example, for the electrolysis of alkali metal chloride brines, are sealed by a method which comprises coating the sections to be sealed with a synthetic thermoplastic sealing agent and ultrasonically sealing the coated portions.

The method permits the sealing-in-place of separator materials and allows them to be unsealed and resealed without damage to the separators.

10 Claims, 2 Drawing Figures

METHOD OF SEALING SEPARATORS FOR ELECTROLYTIC CELLS FOR ALKALI METAL CHLORIDE BRINES

This invention relates to diaphragm-type electrolytic cells for the electrolysis of aqueous salt solutions. More particularly, this invention relates to a method of sealing a separator for an electrolytic cell.

For years commercial diaphragm cells have been used for the production of chlorine and alkali metal hydroxides such as sodium hydroxide which employed a deposited fiber diaphragm, usually of asbestos fibers. Porous asbestos diaphragms, while satisfactory for producing chlorine and alkali metal hydroxide solutions, have a limited cell life and once removed from the cell, cannot be reused. Further, asbestos has now been identified by the Environmental Protection Agency of the U.S. Government as a health hazard.

One suitable replacement for deposited asbestos diaphragms are porous diaphragms comprised of a support fabric impregnated with a nonfibrous active component containing silica. These porous diaphragms are permeable to electrolytes such as alkali metal chloride brines, has increased cell life and can be removed from the cell and reinstalled in the cell respectively without requiring replacement.

Another suitable replacement for asbestos fiber diaphragms are ion exchange membranes which are produced from one or more polymeric materials. These membranes are impermeable to selected ions, for example, anions, and prevent the bulk flow of liquids through them while they permit the passage of other ions such as cations.

To suitably employ these materials as separators, it is frequently necessary to seal together sections of these materials. It is important that the sealing be accomplished in a manner which is effective in preventing undesired leakage through the sealed portions. Leakage resulting from seals along seams or joints can result in a substantial reduction in current efficiency during operation of the cell.

It is known to heat seal these materials by employing suitable equipment which applies heat and pressure along the desired sections. This method, while effectively sealing the materials, does not permit the materials to be "sealed-in-place" as the equipment is unwieldy. In addition, heat sealing melts or fuses the materials together which makes unsealing and resealing difficult, if not impossible.

It is an object of the present invention to provide a method for effectively sealing separators such as diaphragms and ion exchange materials.

A further object of the present invention is to provide a method for sealing separator materials which avoids melting, fusing or thermally damaging the materials.

An additional object of the present invention is to provide a method for sealing separator and membrane materials which can be employed at the location where the materials will be used.

A still further object of the present invention is to provide a method for sealing separator materials which permits the sealed portions to be unsealed without significant damage to the materials.

These and other objects of the present invention are accomplished in a method for sealing a separator material which comprises:

(a) coating a first portion of said separator material with a synthetic thermoplastic resin sealing agent,
(b) contacting said first coated portion with a second portion of said separator material, and
(c) ultrasonically sealing the contacted portions.

More in detail, the novel sealing method of the present invention can be used with separators which are porous diaphragms or ion exchange membranes for electrolytic cells. Suitably sealed by the method of the present invention are membranes comprised of ion exchange resins such as those composed of fluorocarbon resins having cation exchange properties. Examples of perfluorosulfonic acid resin diaphragms, perfluorocarboxylic acid resin diaphragms, composite diaphragms or chemically modified perfluorosulfonic acid or perfluorocarboxylic acid resins. Chemically modified resins include those substituted by groups including sulfonic acid, carboxylic acid, phosphonic acid, amides or sulfonamides. Composite diaphragms include those employing more than one layer of either the perfluorosulfonic or perfluorocarboxylic acid where there is a difference of equivalent weight or ion exchange capacity between at least two of the layers; or where the diaphragm is constructed of both the perfluorosulfonic acid and the perfluorocarboxylic acid resins.

One preferred cation exchange membrane is comprised of a perfluorosulfonic acid resin composed of a copolymer of a polyfluoroolefin with a sulfonated perfluorovinyl ether. The equivalent weight of the perfluorosulfonic acid resin is from about 900 to about 1600, and preferably from about 1100 to about 1500. The perfluorosulfonic acid resin may be supported by a polyfluoroolefin fabric. Perfluorosulfonic acid resin diaphragms sold commercially by E. I. duPont de Nemours and Company under the trademark "Nafion" are suitable examples of the preferred diaphragms.

Another preferred embodiment is a cation exchange membrane comprised of a perfluorocarboxylic acid resin having an ion exchange capacity of up to 1.3 milliequivalents per gram, as produced by Asahi Glass Company.

Porous diaphragms which may be sealed by the method of the present invention include those comprising a support fabric impregnated with a nonfibrous active component containing silica which is permeable to, for example, alkali metal chloride brines. The support fabric is produced from thermoplastic materials which are chemically resistant to and dimensionally stable in the gases and electrolytes present in the electrolytic cell. The fabric supports are substantially nonswelling, nonconducting and nondissolving during operation of the electrolytic cell.

Materials which are suitable for use as support fabrics include thermoplastic materials such as polyolefins which are polymers of olefins having from about 2 to about 6 carbon atoms in the primary chain as well as their chloro- and fluoro-derivatives.

Examples include polyethylene, polypropylene, polybutylene, polypentylene, polyhexylene, polyvinyl chloride, polyvinylidene chloride, polytetrafluoroethylene, fluorinated ethylene-propylene (FEP), polychlorotrifluoroethylene, polyvinyl fluoride, polyvinylidene fluoride, and copolymers of ethylene-chlorotrifluoroethylene.

Preferred olefins include the chloro- and fluoroderivatives such as polytetrafluoroethylene, fluorinated ethylene-propylene, polychlorotrifluoroethylene, polyvinyl fluoride, and polyvinylidene fluoride.

Also suitable as support materials are fabrics of polyaromatic compounds such as polyarylene compounds. Polyarylene compounds include polyphenylene, polynaphthylene and polyanthracene derivatives. For example, polyarylene sulfides such as polyphenylene sulfide or polynaphthylene sulfide. Polyarylene sulfides are well known compounds whose preparation and properties are described in the *Encyclopedia of Polymer Science and Technology*, (Interscience Publishers) Vol. 10, pages 653–659. In addition to the parent compounds, derivatives having chloro-, fluoro- or alkyl substituents may be used such as poly(perfluorophenylene) sulfide and poly(methylphenylene) sulfide.

In addition, fabrics which are mixtures of fibers of polyolefins and polyarylene sulfides can be suitably used.

A preferred form of support fabric is that of a felt fabric.

The separators of both types are flexible and can be readily shaped, for example, to the configuration of an electrode.

In carrying out the method of the present invention, a portion of the separators which are to be sealed is coated with a sealing agent. Suitable sealing agents are thermoplastic resins which have a sealing temperature below the temperature at which the separator materials could be sealed to themselves, for example, by melting or fusing. Sealing agents have sealing temperatures, for example, in the range of from about 50° to about 400° C., preferably from about 100° to about 300° C., and more preferably from about 150° to about 250° C. Examples of synthetic thermoplastic resins suitable as sealing agents include halogenated polyolefins such as polyvinyl chloride, polyvinylidene chloride, polytetrafluoroethylene, fluorinated ethylene-propylene (FEP), polychlorotrifluoroethylene, polyvinyl fluoride, polyvinylidene fluoride, copolymers of ethylene-chlorotrifluoroethylene and mixtures thereof, where the halogens are chlorine or fluorine.

The sealing agents are applied to the separator materials to be bonded in the form of a solution, dispersion, paste or paint. In a preferred embodiment, a coating of the sealing agent is applied to all portions of the separator to be sealed. The coated portions are preferably allowed to dry before being brought together.

The contacted portions are sealed by the application of ultrasonic energy using any suitable ultrasonic devices which are capable of generating sufficient heat to melt the sealing agent and form a bond between the coated portions of the separator materials. For example, ultrasonic welding devices employing power in the range of from about 50 to about 600 and preferably from about 100 to about 400 watts, can be used in the method of the present invention. These devices generate ultrasonic vibrations in the range of from about 20,000 to about 50,000 hertz.

Sealing times of from about 1 to about 10 seconds are quite satisfactory, however, longer or shorter sealing times may be used, if desired.

During the sealing and cooling stages, pressures in the range of from about 10 to about 200 pounds per square inch (psi) are suitably employed.

Separator materials having any desired thickness, for example, from about 0.001 to about 0.250 of an inch can be sealed satisfactorily.

During the sealing step, it may be advantageous to use a heat dissipating means such as a metal strip in contact with the areas being sealed to prevent any possible damage due to local overheating.

After sealing, the bonded area is allowed to cool, preferably while maintaining the pressure used during the sealing. Cooling periods greater than the time required for sealing are preferred, for example, periods which are multiples of the sealing time in the range of 3 to 5.

Where the separator is a porous diaphragm, the impregnation of the support fabric with a silica-containing material may be carried out prior to or after the sealing of the diaphragm has taken place.

The novel sealing method of the present invention enables the separator to be formed in place using portable ultrasonic devices.

Accompanying FIGS. 1 and 2 illustrate separators for enclosing electrode structures which are sealed by the method of the present invention.

Figure 1:
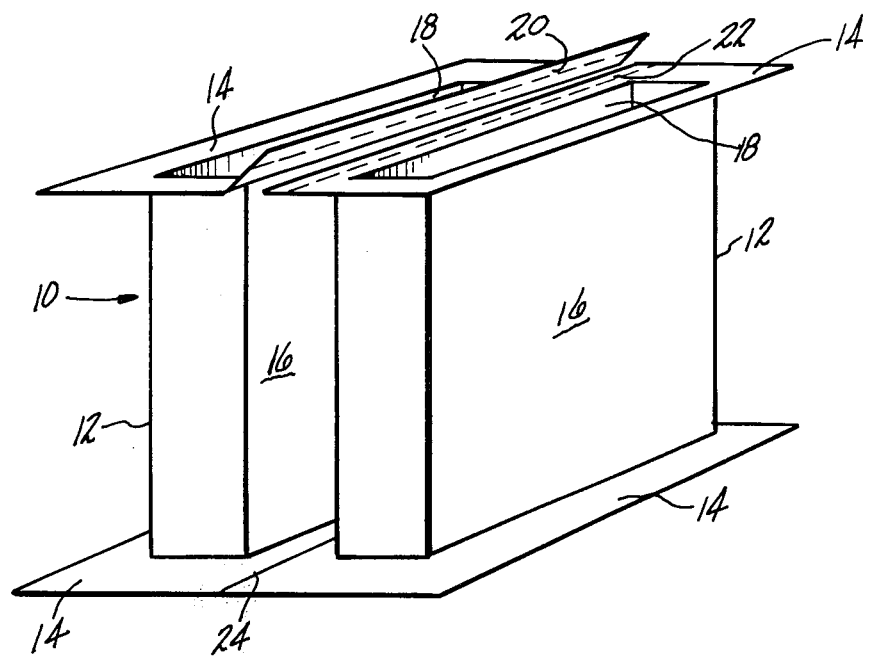
FIG. 1 shows a perspective view of a separator for covering an electrode structure whose sections have been sealed together by the method of the present invention.

FIG. 1 depicts separator 10 employed in covering an electrode structure. Separator 10 is comprised of two sections 12, each having a top and bottom panel 14 attached to a sleeve 16. Sleeve 16 has opening 18 into which an electrode is inserted. To join the two sections 12 together along the top panels 14, edge 20 and edge 22 are coated with a sealing agent and pressed together. Edges 20 and 22 are then sealed together ultrasonically. Bottom panels 14 have been similarly sealed along line 24.

Figure 2:
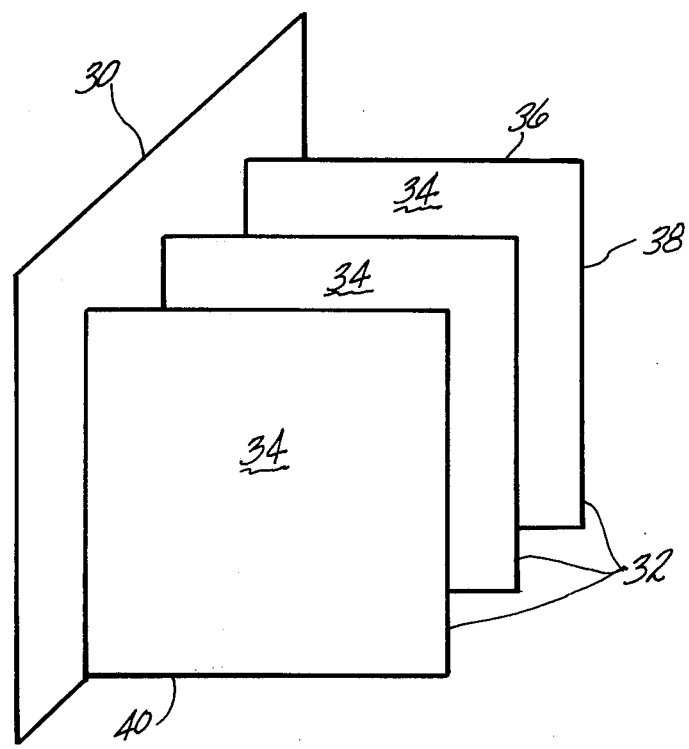
FIG. 2 depicts a perspective view of another form of electrode structure covered by a separator similarly sealed.

FIG. 2 depicts electrode structure 30 having a plurality of electrodes 32. Separators 34 have two identical sides which are ultrasonically sealed along edges 36, 38 and 40 to fabricate the separator in place.

The novel method of the present invention allows the separator to be sealed in place employing conditions which do not cause extensive thermal deterioration of the separator material, for example, by melting or fusing. This method of sealing permits the separators to be unsealed, removed from the electrode structure, remounted on the electrode structure and resealed without requiring replacement of the separator.

The sealing method of the present invention is further illustrated by the following examples.

EXAMPLE 1

A steel screen cathode of the form shown in FIG. 1 was covered by sections of polytetrafluoroethylene felt fabric having a thickness of 0.062 inches. The felt fabric sections were cut and appropriate portions coated with a polyvinylidene fluoride latex having a weight content of 35–40 percent solid particles. The coated portions were allowed to dry for 48 hours. The sections were then assembled and sealed as described above to completely enclose the cathode structure. Sealing was accomplished by manually applying an ultrasonic welding gun (Mastersonic, Inc. Ultrasonic Handgun HG-100) along the coated portions of adjacent sections of felt to provide a temperature of 115° C. which was sufficient to melt the polyvinylidene fluoride latex and provide a bond between the coated portions. During the sealing, a pressure of 50 psi was applied to the coated portions and this pressure was maintained during the period when the sealed portions were cooled.

EXAMPLE 2

A suspension of fluorinated ethylene-propylene (FEP) containing 50 percent solids was heated to form a paste by evaporating a portion of the liquid. Two sections of polytetrafluoroethylene felt fabric (0.128 of an inch thick) were liberally coated with the paste and the paste was allowed to dry. The two sections were then sealed with the ultrasonic handgun used in Example 1 at a temperature of 200° C. while applying a pressure to the sections to be bonded of about 100 psi. The pressure was maintained on the bonded sections of the fabric while cooling took place. An excellent seal of the coated sections was obtained.

EXAMPLE 3

Two sections of a perfluorosulfonic acid membrane material (E. I. duPont de Nemours' NAFION ®710X) were coated with the polyvinylidene fluoride dispersion of Example 1. The sections were sealed ultrasonically at a temperature of 115° C. and a pressure of 20 psi. Following sealing, the membrane material was boiled in a catholyte cell liquor containing 13 percent by weight of sodium hydroxide and 12 percent by weight of sodium chloride. An examination of the sealed section showed no defects in the seals and no loss of mechanical properties to the membrane material. The sealed portions were then unsealed by blowing hot air on sealed portions to remelt the bonding agent and ultrasonically resealed at the same locations with no evidence of damage to the membrane material.

EXAMPLE 4

Two sections of polytetrafluoroethylene felt fabric having a thickness of 0.062 inches were soaked in cell liquor composed of an aqueous solution having 13 percent by weight of sodium hydroxide and 12 percent by weight of sodium chloride. The cell liquor contained a suspension of sepiolite, a magnesium-containing silicate mineral which impregnated the sections of felt fabric. Following impregnation, the fabrics were dried. Portions of the sections of felt fabric were coated with the suspension of fluorinated ethylenepropylene (FEP) used in Example 2. The sections were then ultrasonically sealed at a temperature of 200° C. for a period of 6 seconds while applying a pressure in the range of 70 to 100 psi. Following sealing, the sections were cooled while maintaining the pressure during a period of about 20 seconds.

What is claimed is:

1. A method for sealing a separator material for electrolytic cells for alkali metal chloride brines which comprises:
    (a) coating a first portion of said separator material with a synthetic thermoplastic resin sealing agent which is a halogenated polyolefin selected from the group consisting of polyvinyl chloride, polyvinylidene chloride, polytetrafluoroethylene, fluorinated ethylene-propylene (FEP), polychlorotrifluoroethylene, polyvinyl fluoride, polyvinylidene fluoride, and copolymers of ethylene-chlorotrifluoroethylene, and mixtures thereof,
    (b) contacting said first coated portion with a second portion of said separator material, and
    (c) ultrasonically sealing said contacted portions, said sealing being carried out at a temperature below which said first portion and said second portion could be sealed to themselves.

2. The method of claim 1 in which drying of said coated portion is carried out prior to step b.

3. The method of claim 1 in which said sealing agent has a sealing temperature in the range of from about 50° to about 400° C.

4. The method of claim 1 in which said halogenated polyolefin is selected from the group consisting of fluorinated ethylene-propylene (FEP) and polyvinylidene fluoride.

5. The method of claim 4 in which said separator material is a felt fabric.

6. The method of claim 5 in which said felt fabric is comprised of a polyolefin selected from the group consisting of polychlorotrifluoroethylene and polytetrafluoroethylene.

7. The method of claim 6 in which said sealing agent is polyvinylidene fluoride.

8. The method of claim 4 in which said separator material is an ion exchange membrane comprised of copolymers of a perfluoroolefin and a fluorosulfonated perfluoropolyvinyl ether where said copolymers have an equivalent weight of from about 900 to about 1600.

9. The method of claim 8 in which said sealing agent is fluorinated ethylene-propylene (FEP).

10. The method of claim 5 or 8 in which said sealing agent has a sealing temperature in the range of from about 100° to about 300° C.

* * * * *